April 14, 1936.  J. H. SMITH  2,037,280
PIE PAN
Filed June 22, 1935   2 Sheets-Sheet 1
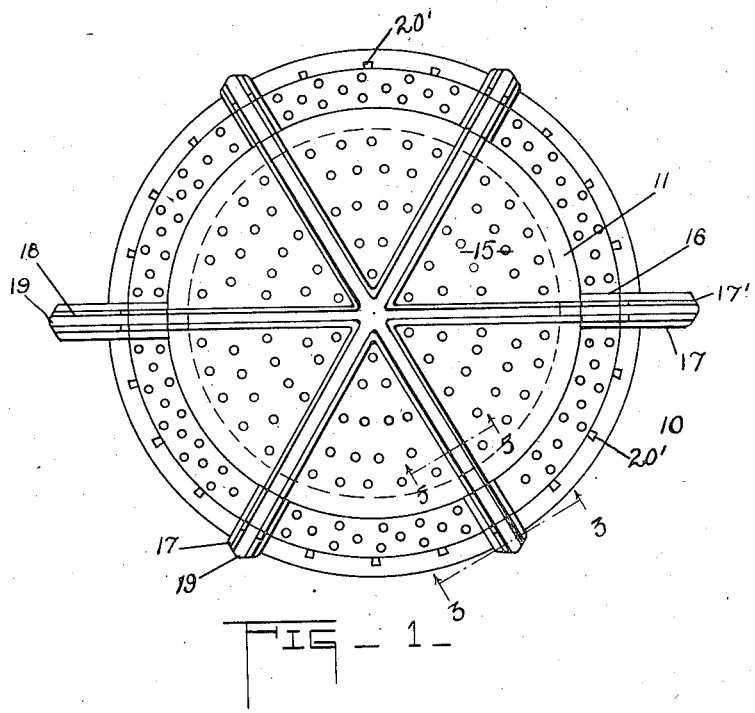
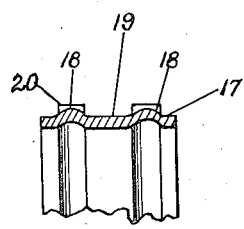
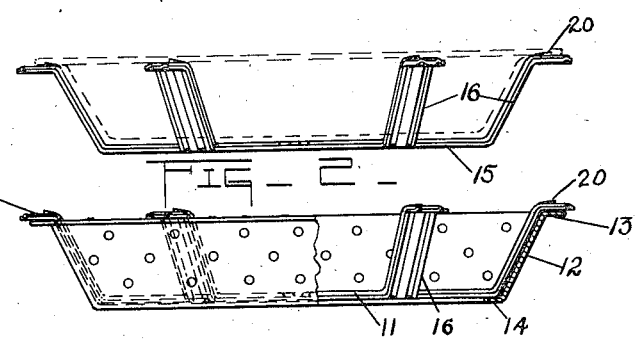
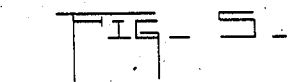
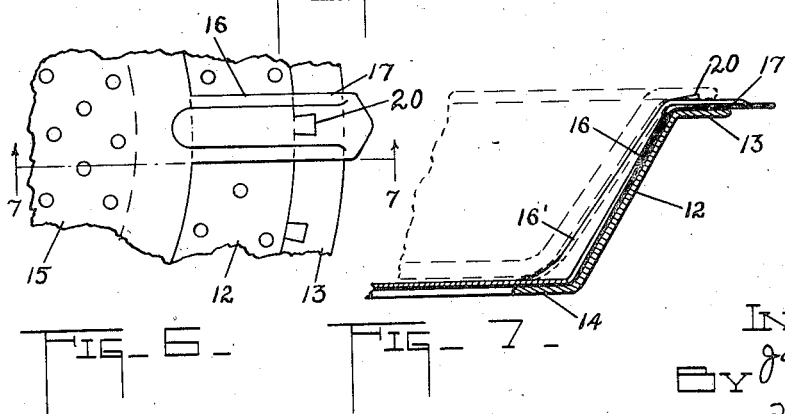
INVENTOR
James H. Smith
BY Zefft & Zefft
ATTORNEYS April 14, 1936.  J. H. SMITH  2,037,280
PIE PAN
Filed June 22, 1935  2 Sheets-Sheet 2
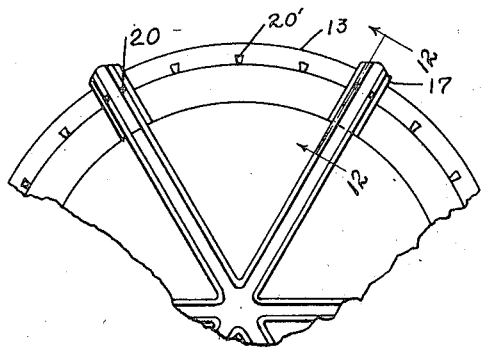
FIG-8-
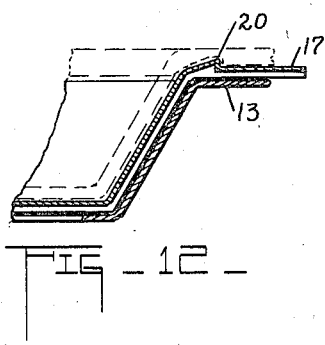
FIG-12-
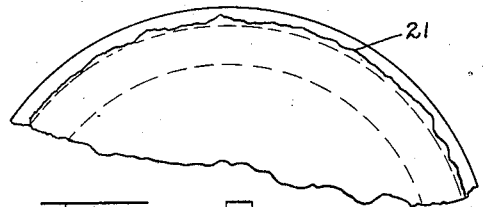
FIG-9-
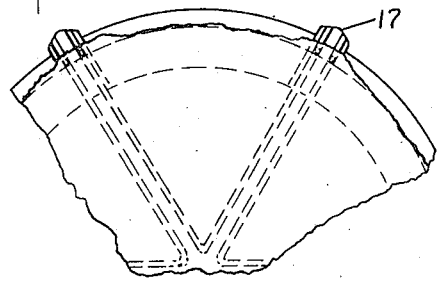
FIG-10-
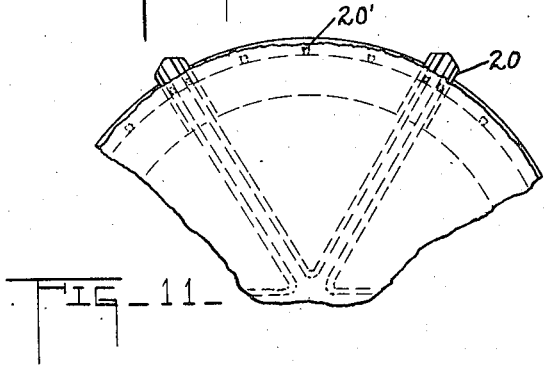
FIG-11-
INVENTOR
James H. Smith
BY
Jefft v Jefft
ATTORNEYS Patented Apr. 14, 1936

2,037,280

UNITED STATES PATENT OFFICE 2,037,280

PIE PAN

James H. Smith, Peoria, Ill.

Application June 22, 1935, Serial No. 27,852

6 Claims. (Cl. 53—6)

This invention has reference to pans and associate devices to be used in the baking and subsequent handling of pies and the like.

The principal object of my invention lies in the provision of a pan for baking pies and a cooperative element adapted to assist the user in removing a baked, cut pie from the pan to expose an enlarged surface thereof to the air of cooling and at the same time properly support the cut side walls of the crust to prevent crumbling or falling thereof, and finally to hold the cut pieces in such a manner as to be easily removed without danger of mutilating the crust or contents.

An additional object is to provide a pie baking utensil provided with means for preventing undue shrinkage of the outer rim of the pie crust during baking thereof.

It is well known that the usual procedure in making a pie of the open top variety is to first place the dough in the pan and bake the same to form a crust shell, after which the filling is placed in the crust and the whole is subjected to a final baking operation.

During the original baking operation the dough becomes quite soft due principally to liquefication of the grease content, and the edges lying upon the outer rim of a conventional pie tin tend to fall or slide downwardly into the pan whereby the rim of the crust is given a shrunken appearance.

To prevent such occurrence it is necessary for the user to pinch the edge of the crust around the edge of the tin to form a temporary holding means to prevent movement of the crust during baking.

After the baking is complete, it is desirable, and generally necessary, to allow the pie to cool before removing the pie from the pan for the reason that the filling and crust, while very hot are seldom stiff enough to be self supporting and it is therefore quite difficult to remove the pie from the pan until after it has cooled sufficiently to allow the filling to congeal and the crust to become stronger.

It is further desirable, for best results in serving, to serve the pie as soon as practicable after it leaves the oven, and to cool the same as rapidly as possible in order to arrest penetration of the liquids of the filling into the crust, which penetration, if extensive, results in wetting and sogging of the crust and degradation of the otherwise high quality of the pie.

My device provides means for preventing shrinkage of the crust away from the rim as noted and for removing the pie from the pan so as to expose a large area of the pie to promote rapid cooling and setting, while at the same time properly supporting the crust so as to prevent damage thereto during removal and cooling.

It is also desirable to cut the pie for serving before removing the same from the baking utensil. It would obviously be difficult to remove a cut piece of freshly baked pie from a conventional pie pan, there being danger of breaking the crust and disturbing the filling, however it is necessary to cut the pie before it is entirely removed from its supporting means and to facilitate cutting and removal I provide means whereby the pie may be cut in a predetermined manner before removal from the pan, which means also supports the cut edges of the upstanding portion of the crust after the removal from the pan, all to the end that a pie may be efficiently baked, cut, safely removed from the pan to cool rapidly without danger of injury to the pie and conveniently supported for safe and successful serving.

In carrying out my invention I provide elements shown in the accompanying drawings in which:

Fig. 1 is a plan view showing the device in assembled position.

Fig. 2 is a side elevational view showing an element of the device with a pie disposed therein.

Fig. 3 is a side elevational view with a portion of the wall of the pan broken away to facilitate description;

Fig. 4 is a fragmental sectional view taken on line 3—3 in Fig. 1;

Fig. 5 is a similar view taken on line 3—3 of Fig. 1;

Fig. 6 is an enlarged fragmental plan view showing details of construction to be described;

Fig. 7 is a sectional elevational view taken on line 7—7 in Fig. 5.

Figs. 8 to 11 are fragmental plan views showing features to be explained; and

Fig. 12 is an elevational sectional view taken on line 12—12 in Fig. 8.

The assembly consists of two cooperative parts, a ring member 10 and a bottom member 11.

The ring member resembles a conventional pie pan with the bottom removed. It has the conventional side wall 12 and outwardly directed flange portion 13. The opening left after removing the bottom is of such dimensions and so disposed as to leave an inwardly directed flange portion 14, shown best in Fig. 7.

The bottom member comprises a single piece which is so fashioned as to have a circular bottom portion 15 of larger diameter than that of the opening in member 10 and plural relatively narrow portions 16 extending radially from portion 15 substantially as shown in Fig. 1.

Portions 16 are fashioned to extend upwardly at angles which correspond to that of member 10 so that member 11 may be placed within member 10 with portions 16 resting against wall portion 12, in which position the assembly is ready to receive the crust to be baked.

The upper ends of portions 16 have outwardly directed portions 17, which extend a short distance beyond the flange portion 13. The portions 16 are preferably ribbed as shown at 16' in Fig. 2, or ribs 18 may be disposed in parallel relation and extend from the portions 17 on one side to the opposite portion 17 whereby to lie upon a pattern of radial lines as in Fig. 1.

Two or more of the portions 17 may extend considerably beyond flanges 13, as at 17' in Fig. 1, to facilitate handling as will be noted later.

Figs. 3 and 4 illustrate that the ribs are so disposed as to have a depressed portion 19 between them and it will be apparent that the depressed portion becomes a trough whereby the knife used in cutting is accurately guided to accomplish a neat and evenly spaced cut. The portions 17 extend beyond the peripheral line of the pie crust and thus become markers to indicate positions to begin and end a cut.

The ribs have the further function of stiffening the structure so that relatively thin material may be used without undue flexibility.

The wall portions 12 and bottom portion 15 are preferably perforated as shown to permit easy escape of steam during baking.

It will be noted that the portions 17 are provided with relatively small upstanding lugs 20, and that rim 13 is provided with similar projections 20' spaced apart substantially as shown.

As shown in detail in Fig. 12, the lugs 20 are fashioned to present a substantially abrupt face toward the outside of the rim and the same are obviously adapted to engage the soft dough in a hooking relation whereby the rim of the crust is supported against drawing away toward the center of the pan during initial baking as above noted.

The lugs 20' on the rim co-operate with the lugs 20 to hold the crust at points between the portions 17.

Fig. 9 of the drawings illustrates the result to the pie crust of baking in an ordinary pan without special care in pinching or beading the crust over the edge of the pan. The outer edge of the crust 21 is withdrawn. A pie baked in such a crust would have an unsightly appearance and would be deprived of a good supporting rim.

Fig. 10 illustrates the effect of providing lugs 20 only on the portions 17. The crust is properly supported where it rests upon the portions 17 but is fallen away between them.

Fig. 11 illustrates the manner in which lugs 20' cooperate with lugs 20 to hold the crust evenly at all points of its rim.

In practical use, member 11 is placed inside member 10 as shown. The article to be baked is next placed in the assembly, with the soft dough automatically forming engagement with lugs 20 and 20', and baked as with an ordinary pie in a conventional pan.

After baking is complete, portion 11, together with the pie is removed from portion 10 as by means of portions 17', whereupon the large area between portions 12 is exposed to the air to permit free escape of steam and consequent rapid cooling.

Before or after removal of the pie from member 10 it may be cut into sections for serving.

Due to the indicating feature of portions 17 and the guiding action of troughs 19 the pie is easily cut in a neat and accurate manner.

The cut edges of the outer wall crust will lie toward each side of the trough and will be firmly supported against falling backward by portions 12. Thus the crust will be held in position until the pie is properly cooled and congealed.

It will be apparent that the pie sections may be easily and safely removed from the member 11 by insertion of a spatula or knife between portion 15 and the bottom crust at a point midway between portions 12.

The foregoing has described my invention, the structure of which may obviously be modified without alteration of principle. I do not wish to be limited in structure or function except within the scope of the appended claims.

What I claim is:

1. A pie baking utensil comprising a ring member having a substantially upright annular wall, a separable member adapted to be disposed inside said ring to form a bottom for the ring, a plurality of radially disposed portions extending from the latter member disposed to lie adjacent the inside surface of said wall, the assembly of said members adapted to contain a pie crust, said radially disposed portions extending a sufficient distance to project beyond the outer periphery of the pie, a plurality of troughs formed in said separable member extending radially across the bottom thereof and longitudinally of said extending portions whereby the extending ends of the latter form means for indicating the ends of the troughs to enable a user to begin cuts of the pie in register with said troughs, said troughs forming a means for guiding the cutting knife accurately across the pie toward another of said extending portions.

2. A device as set forth in claim 1 wherein said separable member, together with the pie, is adapted to be removed from the ring and said extending portions are adapted to support the wall crust of the pie at both sides of the cut in the pie.

3. A device as set forth in claim 1 provided with means for preventing inward movement of the rim of said pie crust.

4. A pie baking utensil comprising a ring member having a substantially upright annular wall, a separable member adapted to be disposed in said ring to form a bottom for the ring, a plurality of radially disposed portions extending from the latter member disposed to lie adjacent the inside surface of said wall, the assembly of said members adapted to contain a pie crust, a plurality of troughs formed in said separable member extending radially across the bottom thereof and longitudinally of said extending portions, said troughs forming a means for guiding a cutting knife accurately across the pie from one of said extending portions to another.

5. A device as set forth in claim 4 wherein said separable member, together with the pie is adapted to be removed from the ring and the extending portions are adapted to support the wall crust of the pie at both sides of each cut in the crust, leaving relatively large areas of the wall crust exposed to the air between the extending portions.

6. A pie baking utensil comprising a ring member having an upwardly directed annular wall, a separable member adapted to form a bottom for the ring, said separable member having a plurality of radially disposed portions adapted to lie adjacent said wall, and means on said annular wall and extending portions for preventing inward movement of the rim of the pie crust.

JAMES H. SMITH.